United States Patent
Bender et al.

(10) Patent No.: US 8,274,948 B2
(45) Date of Patent: *Sep. 25, 2012

(54) DISTRIBUTED INFRASTRUCTURE FOR WIRELESS DATA COMMUNICATIONS

(75) Inventors: Paul E. Bender, San Diego, CA (US);
Matthew S. Grob, La Jolla, CA (US);
Robert H. Kimball, San Diego, CA (US); Gadi Karmi, Chicago, IL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/778,005

(22) Filed: May 11, 2010

(65) Prior Publication Data
US 2010/0220688 A1 Sep. 2, 2010

Related U.S. Application Data (63) Continuation of application No. 11/781,895, filed on Jul. 23, 2007, now Pat. No. 7,715,356, which is a continuation of application No. 09/837,151, filed on Apr. 18, 2001, now Pat. No. 7,248,572, which is a continuation-in-part of application No. 09/790,383, filed on Feb. 21, 2001, now abandoned, which is a continuation of application No. 09/158,047, filed on Sep. 22, 1998, now Pat. No. 6,215,779.

(51) Int. Cl.
*H04W 4/00* (2009.01)

(52) U.S. Cl. .......................... 370/331; 455/436

(58) Field of Classification Search ............... 370/331, 370/328, 329, 318, 401; 455/432.1, 433, 455/436
See application file for complete search history.

(56) References Cited

U.S. PATENT DOCUMENTS

| | | |
|---|---|---|
| 5,384,826 A | 1/1995 | Amitay |
| 5,457,680 A | 10/1995 | Kamm |
| 5,490,139 A | 2/1996 | Baker |

(Continued)

FOREIGN PATENT DOCUMENTS

CN 1283911 A 2/2001

(Continued)

OTHER PUBLICATIONS

International Search Report—PCT/US99/021801, International Search Authority—European Patent Office—Apr. 6, 2000.

(Continued)

*Primary Examiner* — Brian D Nguyen
(74) *Attorney, Agent, or Firm* — Florin C. Corie; Ashish L. Patel (57) ABSTRACT

A mobile user terminal 402 accesses a packet data network 450 through one or more of several network access points 404-412. One or more control points 432-440 determines which network access point or points the user terminal is to access. Control may be retained in the current control point, or transferred to another control point, whenever it is convenient. There are preferably several routers, each having an associated home agent 418-420 which determines which foreign agents need to be accessed on behalf of each user terminal. There are several foreign agents 422-430, which forward packets received from a user terminal's home agent to the control point currently controlling communications with the user terminal.

11 Claims, 5 Drawing Sheets

U.S. PATENT DOCUMENTS

| | | | |
|---|---|---|---|
| 5,682,600 | A | 10/1997 | Salin |
| 5,726,984 | A | 3/1998 | Kubler |
| 5,917,900 | A | 6/1999 | Allison et al. |
| 5,946,359 | A | 8/1999 | Tajiri |
| 5,958,018 | A | 9/1999 | Eng |
| 5,978,673 | A | 11/1999 | Alperovich |
| 6,094,740 | A | 7/2000 | Boccuzzi |
| 6,215,779 | B1 | 4/2001 | Bender |
| 6,243,575 | B1 | 6/2001 | Ohyama |
| 6,317,609 | B1 | 11/2001 | Alperovich |
| 6,377,982 | B1 | 4/2002 | Rai |
| 6,389,010 | B1 | 5/2002 | Kubler |
| 6,424,639 | B1 | 7/2002 | Lioy |
| 6,473,411 | B1 | 10/2002 | Kumaki |
| 6,473,413 | B1 | 10/2002 | Chiou |
| 6,496,505 | B2 | 12/2002 | La Porta |
| 6,512,754 | B2 | 1/2003 | Feder |
| 6,535,493 | B1 | 3/2003 | Lee |
| 6,587,457 | B1 | 7/2003 | Mikkonen |
| 6,717,916 | B1 | 4/2004 | Ahn |
| 6,771,962 | B2 | 8/2004 | Saifullah |
| 6,937,566 | B1 | 8/2005 | Forslow |
| 6,970,434 | B1 * | 11/2005 | Mahany et al. ............... 370/256 |
| 7,248,572 | B2 | 7/2007 | Bender |
| 7,715,356 | B2 | 5/2010 | Bender et al. |
| 2001/0024437 | A1 | 9/2001 | Bender et al. |
| 2002/0089958 | A1 * | 7/2002 | Feder et al. .................... 370/338 |

FOREIGN PATENT DOCUMENTS

| | | |
|---|---|---|
| CN | 1293911 | 2/2001 |
| EP | 0813346 | 12/1997 |
| EP | 0963082 | 12/1999 |
| EP | 1081899 | 3/2001 |
| GB | 2247811 | 3/1992 |
| JP | 8018503 A | 1/1996 |
| JP | 10079699 A | 3/1998 |
| JP | 10200502 A | 7/1998 |
| JP | 10215218 A | 8/1998 |
| JP | 11-261561 | 9/1999 |
| JP | 11266278 A | 9/1999 |
| JP | 2002-223219 | 8/2002 |
| JP | 2002525974 | 8/2002 |
| RU | 2137307 | 9/1999 |
| WO | WO9627994 | 9/1996 |
| WO | WO9948237 | 9/1999 |
| WO | WO0018067 | 3/2000 |

OTHER PUBLICATIONS

International Search Report—PCT/US02/012191, International Search Authority—European Patent Office—Nov. 18, 2002.

International Preliminary Examination Report, PCT/US02/012191, International Preliminary Examining Authority, United States, Nov. 13, 2003.

Gorokhov, P.K., "Explanatory Dictionary in Radioelectronics," Moscow, Russkii Yazyk, 1993, p. 213 (In Russian).

Platt, et al. "Distributed Management of Mobility for Mobile Cellular Networks" Proceedings for International Conference On Computer Communication 13: 351-357 (1997).

Yamada, et al., "A study on mobile communication control systems based on distributed micro switches", technical report of The Institute of Electronics, Information and Communication Engineers (Technical Report of IEICE), SSEE97-23 RCS97-18, Jun. 23, 1997.

Yokoyama, Mitsuo "Decentralization and Distribution in network Control of Mobile Radio Communications" The Transactions of the IEICE:E73(10): 1579-1586 (1990).

European Search Report—EP10000993, Search Authority Munich Patent Office—Mar. 9, 2010.

European Search Report—EP10000994, Search Authority Munich Patent Office—Mar. 5, 2010.

* cited by examiner

PRIOR ART

FIG. 1

PRIOR ART

DISTRIBUTED INFRASTRUCTURE FOR WIRELESS DATA COMMUNICATIONS

CLAIM OF PRIORITY UNDER 35 U.S.C.§120

The present Application for Patent is a Continuation and claims priority to application Ser. No. 11/781,895, filed Jul. 23, 2007, now U.S. Pat. No. 7,715,356 issued May 11, 2010; which was a continuation of application Ser. No. 09/837,151 entitled "DISTRIBUTED INFRASTRUCTURE FOR WIRELESS DATA COMMUNICATIONS" filed Apr. 18, 2001, now U.S. Pat. No. 7,248,572 issued Jul. 24, 2007; which was a continuation-in-part of application Ser. No. 09/790,383, filed Feb. 21, 2001 now abandoned; which was a continuation of application Ser. No. 09/158,047, filed Sep. 22, 1998, now U.S. Pat. No. 6,215,779 issued Apr. 10, 2001; which are assigned to the assignee hereof and hereby expressly incorporated by reference herein.

TECHNICAL FIELD

This invention pertains to wireless communications systems and, in particular, to wireless packet data networks.

BACKGROUND ART

FIG. 1

Figure 1:
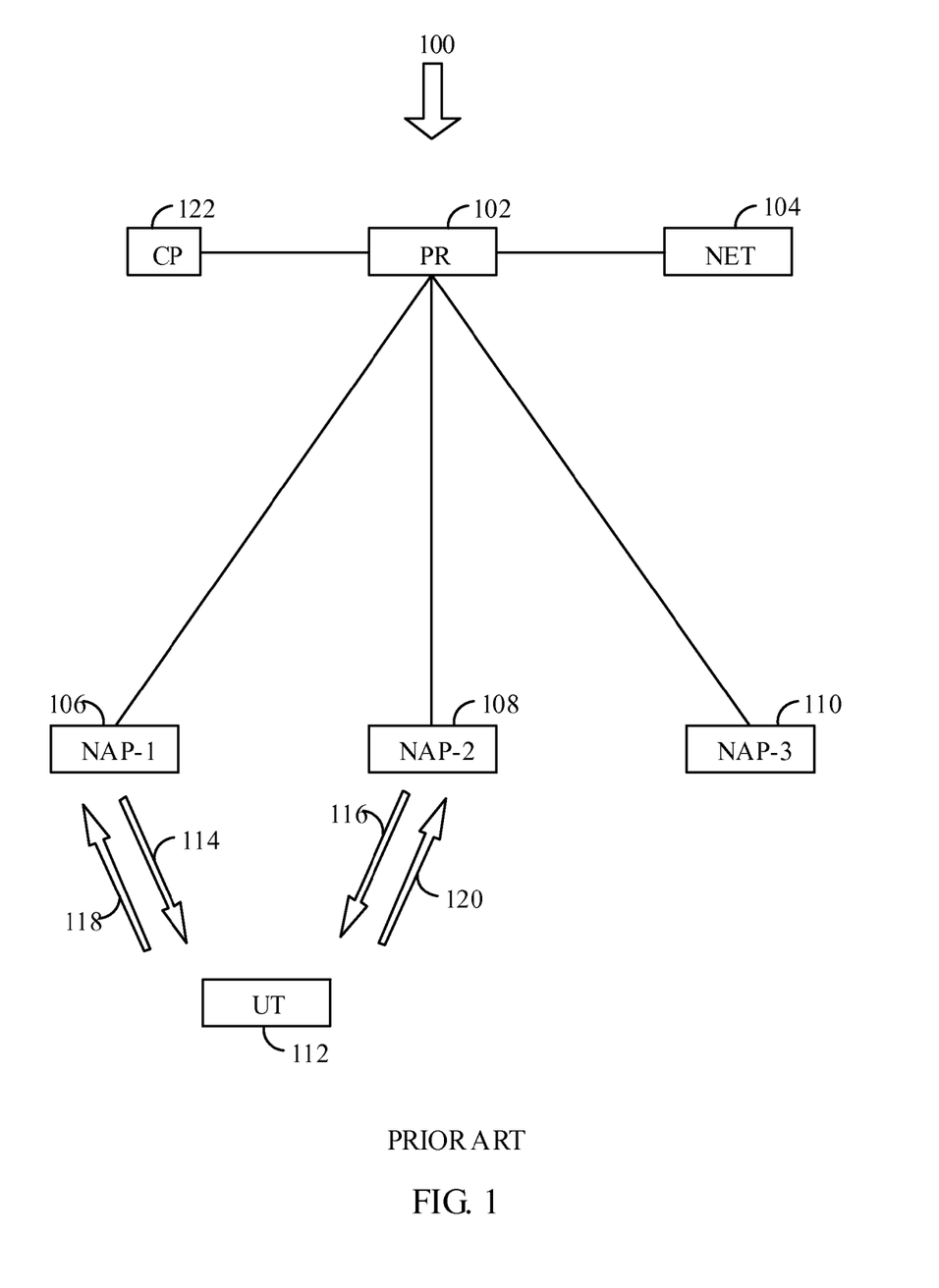
FIG. 1 shows a conventional single-router wireless packet data network.

FIG. 1 shows a conventional single-router wireless packet data network 100. A packet router 102 receives data packets from the remainder of a network 104 and routes them to one or more network access points 106-110. The network access points 106-110 transmit the packets forward to a user terminal 112 over forward wireless links 114-116. The user terminal 112 transmits packets back to the network access points 106-110 over reverse wireless links 118-120. The user terminal 112 may be a cellular telephone carried by a person, a portable computer, a mobile telephone in an automobile, or any other mobile device which must continue to provide connectivity even while it moves.

A control point 122 is connected to the packet router 102. It manages the wireless links 114-120. Management includes many functions. For example, as the user terminal 112 moves around the path loss between it and the network access points 106-110 changes. In the situation shown in FIG. 1, the control point 122 must cause the user terminal 112 to transmit with the minimum amount of power required to be received by at least one of network access points 106-110. Mobile station transmit power is minimized since it causes interference to transmissions from other mobile stations. When the user terminal moves from the area served by network access point 106 to the area served by network access point 108, there will be a handoff of the user terminal 112 from network access point 106 to network access point 108. The control point 122 must manage the handoff. Other management functions are known to those with skill in the art.

FIG. 2

Figure 2:
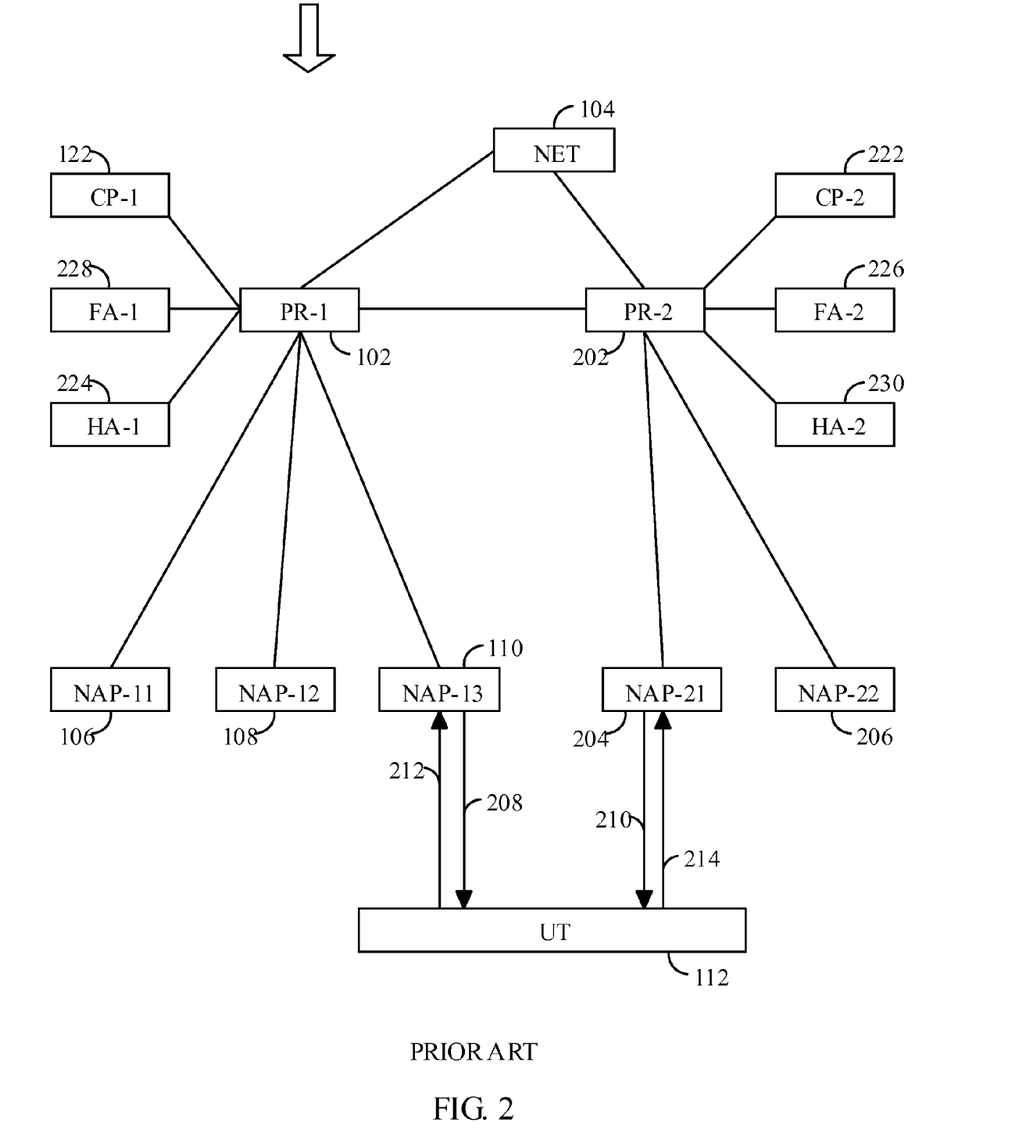
FIG. 2 shows a conventional multiple-router wireless packet data network.

FIG. 2 shows a conventional multiple-router wireless packet data network 200 supporting a mobility protocol such as Mobile IP as described in the Internet Engineering Task Force RFC 2002. A second packet router 202 is connected to the first packet router 102, to the rest of the network 104, or (as shown) to both. Second packet router 202 is connected to network access points 204-206. In FIG. 2, the user terminal 112 is moving from the area served by network access point 110 (where it is served by forward link 208) to the area served by network access point 204 (where it is served by forward link 210). Control point 122 manages the wireless links during this handoff (including the management of reverse links 212-214) in much the same way as during the handoff shown in FIG. 1. If desired, control can be passed from first control point 122 to second control point 222. These control points are connected to first and second packet routers 102 and 202, respectively.

FIG. 2 also shows a home agent 224 and a foreign agent 226. Home agent 224 is connected to first packet router 102, and foreign agent 226 is connected to second packet router 202.

User terminal 112 has a network address for which packet router 102 advertises reachability. A packet intended for user terminal 112 is therefore sent to first packet router 102. When user terminal 112 is in the coverage area of network access points associated with packet router 102 (106-110), packet router 102 will forward the packet to control point 122 which will send the packet for transmission to the network access points that currently provide a forward wireless link to the user terminal 112.

User terminal 112 may leave the area served by first packet router 102 and may enter the area served by second packet router 202. The net 104 will send packets destined to user terminal 112 to packet router 102 which will then forward them to home agent 224 which maintains track of user terminal 112's current location in the form of a "care-of" address. The home agent will then encapsulate these packets in packets destined to the care-of address of the user terminal (e.g., foreign agent 226) and send these packets through packet routers 102 and 202. Upon receiving these packets, foreign agent 226 will de-capsulate the packets and forward the packets destined for transmission to user terminal 112 to control point 222. Control point 222 will then forward the packets for transmission to the network access points that currently provide a forward wireless link to the user terminal 112.

In this method, control of the network access points for a data connection has moved from control point 122 to control point 222. In another conventional method, control does not move between the two control points, in which case packet router 102 continues to forward packets for transmission to user terminal 112 to control point 122 which then sends the packets directly to whatever network access points provide a forward wireless link to user terminal 112, regardless of the system in which these network access points are located. E.g., control point 122 may forward packets for transmission to network access points 106-110 as well as 204-206.

This architecture suffers from several fundamental problems: the control points for each part of the network are single points of failure, which must be made highly reliable, increasing their cost. Furthermore, since they are unique for each network, the architecture does not scale well as the number of network access points increase, increasing with it the population of mobile terminals that can be served and consequently, the load presented to the control points. Last, emerging high speed wireless protocols require low-latency control by the control point which is not possible due to the transmission and queuing delays between the control points and the network access points.

Additionally, because the router is connected to one or more network access points, the router's failure results in failure of users' service in the area served by the one or more network access points connected to this router.

DISCLOSURE OF INVENTION

Applicants provide a solution to the shortcomings of the previously described architecture by distributing the functionality of the control points and allowing the co-location of a control point with every network access point. The architecture proposed by the applicants is further optimized by co-locating foreign agents with the network access points and control points.

Furthermore, if a particular architecture employs a plurality of routers, each access point may be connected to more than one of the routers.

MODES FOR CARRYING OUT THE INVENTION

FIG. 3

Figure 3:
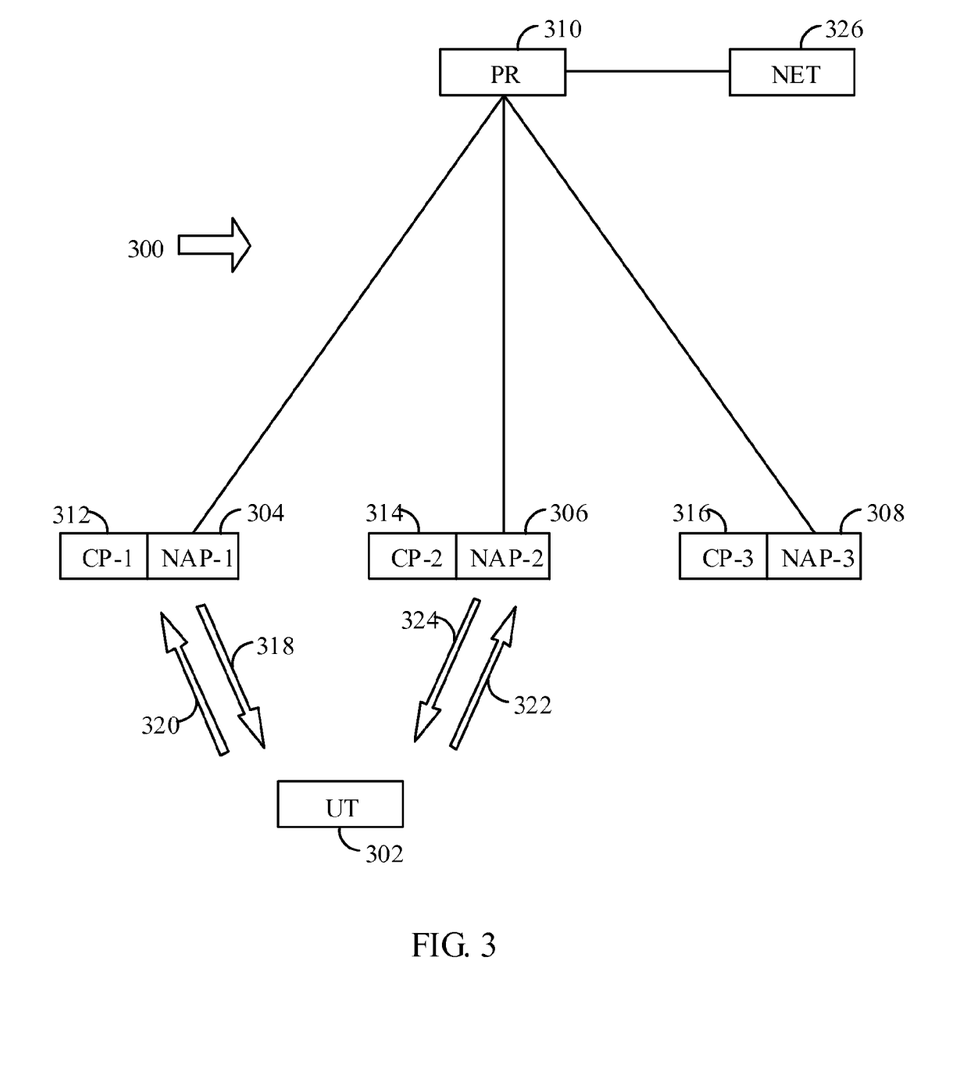
FIG. 3 shows a single-router wireless packet data network, according to the present invention.

FIG. 3 shows a single-router wireless packet data network 300, according to the present invention.

A user terminal 302 is configured to transmit and receive wireless data packets.

There is plurality of network access points 304-308, each being configured to transmit wireless data packets to, and to receive them from, the user terminal 302. A router 310 is capable of transmitting data packets to, and receiving them from, the network access points 304-308. FIG. 3 shows the situation in which a user terminal is leaving the area served by first network access point 304 and is entering the area served by second network access point 306.

There is a plurality of control points 312-316. As in the prior art, each control point is configured to manage a wireless link 318-324 between the user terminal 302 and the selected network access point 304-308. However, there are plural control points 312-316 instead of a single control point 122. In this invention, a user terminal is served by the control point that is co-located with the first network access point with which the user terminal has established communications for a particular data exchange. In the example of FIG. 3, user terminal 302 is currently connected to both network access points 304 and 306. If the first network access point to serve the user terminal was network access point 304, the control point will be control point 312. Otherwise, the control point will be control point 314. Using this convention multiple user terminals accessing the network will be controlled by a plurality of control points thus sharing the load between the control points. Furthermore, a failure of a control point would only affect the user terminals served by it, rather than the entire population of user terminals.

Each control point 312-316 is configured to select a network access point 304-308 to communicate with the user terminal 302. In FIG. 3, first control point 312 has selected first network access point 304 as the network access point to communicate with the user terminal 302. However, as user terminal 302 leaves the area served by first network access point 304 and enters the area served by second network access point 306, first control point 312 selects both network access points 304, 306 to communicate with user terminal 302. First control point 312 then selects only second network access point 306 to communicate with user terminal 302, thus effecting a soft handoff. First control point 312 may retain control even after the process has ended, or it may transfer control to second control point 314. Third control point 316 was not used during the process just described, but remains available in case user terminal 302 moves into the area served by third network access point 308. The operator may establish any convenient method for determining when to retain control in the current control point and when to transfer control to another control point.

Soft handoff is not the only possible event which triggers a decision on whether to retain control in the current control point or to transfer control to another control point. Load sharing, failure of a control point, and similar considerations may be used by the operator to determine when to trigger a decision.

Using a mobility protocol such as Internet Engineering Task Force RFC 2002, packets destined to user terminal 302 are routed from router 310 to the control point that currently control communications with user terminal 302.

The actual network access point used to communicate with the user terminal may be different from the control point's associated network access point, or may be the same.

If desired, each control point may be configured to select a plurality of network access points to concurrently communicate with the user terminal. In this case, all of the selected network access points may be different from the control point's associated network access point, or one of the selected network access points may be the same as to control point's associated network access point.

Each control point may be configured, if desired, to cache data link protocol information for the user terminal during periods when the user terminal is not assigned a traffic channel. If this is done, the caching control point may be associated with the network access point first used by the user terminal, with the network access point last used by the user terminal, or any other point.

FIG. 4

Figure 4:
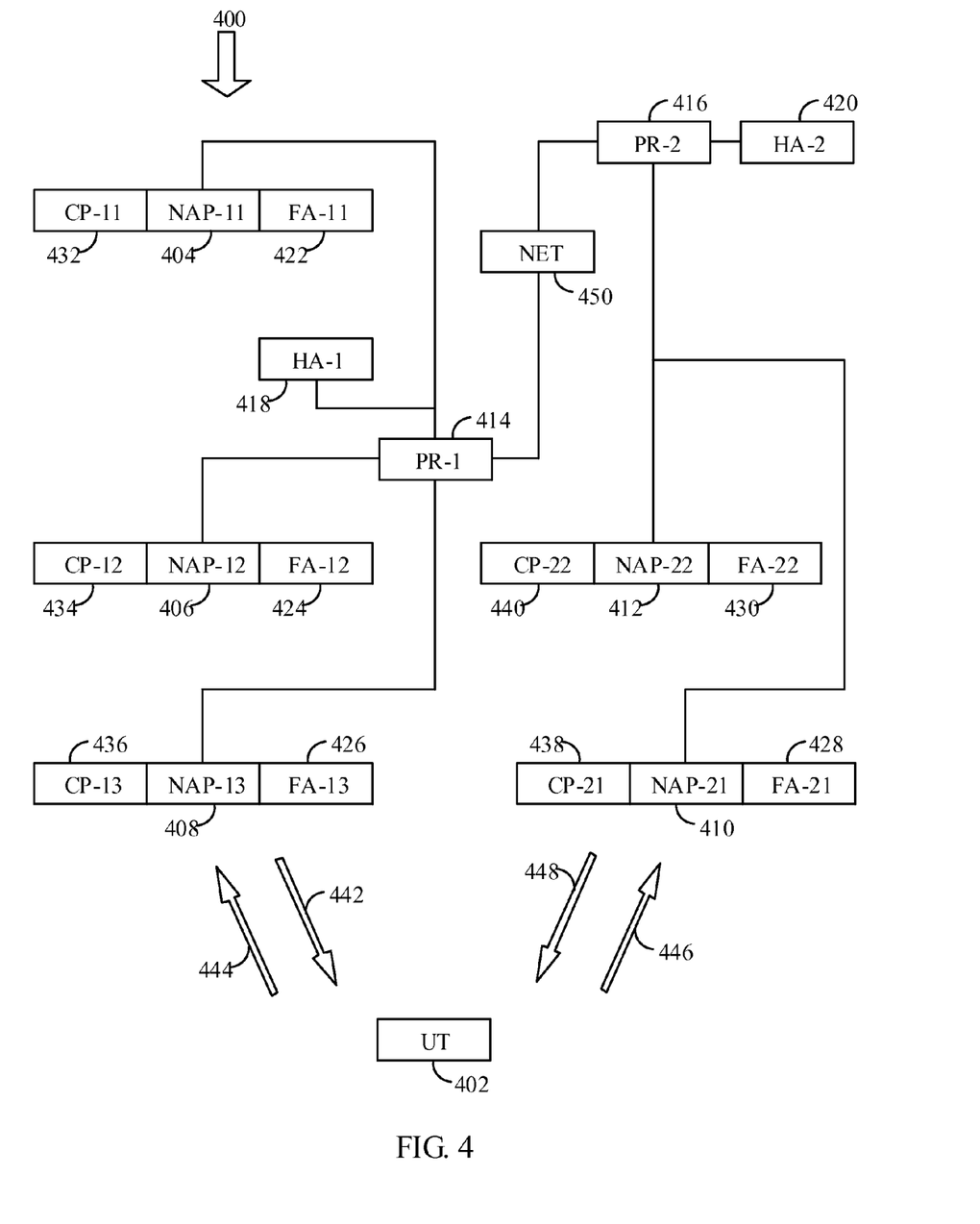
FIG. 4 shows a multiple-router wireless packet data network, according to one embodiment of the present invention.

FIG. 4 shows a multiple-router wireless packet data network 400, according to one embodiment of the present invention.

A user terminal 402 is configured to transmit and receive wireless data packets. There is a plurality of network access points 404-412, each configured to transmit wireless data packets to, and to receive them from, the user terminal 402. There are one or more routers 414-416 capable of transmitting data packets to, and receiving them from, the network access points 404-412. Each network access point 404-412 is connected to only one router 414-416. There are one or more home agents 418-420. Each home agent 418-420 is associated with a router 414-416. The home agents encapsulate packets destined to user terminals registered with them in packets destined to the current care-of address of the user terminal. This address is the address of the foreign agent co-located with the control point that is controlling communications with the user terminal. The foreign agent may be connected to the same router as the home agent or to a different router. The use of home agents and foreign agents is well known to those skilled in the art and is described in such mobility protocols as Internet Engineering Task Force RFC 2002.

There is a plurality of foreign agents 422-430. Each foreign agent 422-430 is also associated with a network access point 404-412 and a control point 432-440. Each foreign agent is configured to receive packets for user terminals currently being served by the control point co-located with it. The foreign agent receives packets destined to it. If these packets contain packets destined to such user terminals, it de-capsulates these packets and forwards them to the control point.

There is a plurality of control points 432-440. As in FIG. 3, each control point 432-440 is associated with a network access point 404-412. Each control point 432-440 is configured to select one or more network access points 404-412 to communicate with the user terminal 402. Each control point 432-440 is further configured to manage a wireless link 442-448 between the user terminal 402 and the selected network access point or points 408-410. The user terminal 402 thus stays in communication with the rest of the network 450 even when moving.

The selected network access point may be different from, or the same as, the control point's associated network access point.

Each control point may be configured to select a plurality of network access points to concurrently communicate with the user terminal. If so, all of the selected network access points may be different from the control point's associated network access point, or one of them may be the same.

Following a handoff, control may either remain in the original control point or may be transferred to the control point associated with the new network access point. As in the apparatus of FIG. 3, the operator may establish any convenient method for determining when to retain control in the current control point and when to transfer control to another control point. Also as in the apparatus of FIG. 3, soft handoff is not the only possible event which triggers a decision on whether to retain control in the current control point or to transfer control to another control point. Load sharing, failure of a control point, and similar considerations may be used by the operator to determine when to trigger a decision.

In any event, each control point may be further configured to cache data link protocol information for the user terminal during periods when the user terminal is not assigned a traffic channel. This may be done in the control point associated with the network access point first used by the user terminal, last used by the user terminal, or any other control point.

FIG. 5

Figure 5:
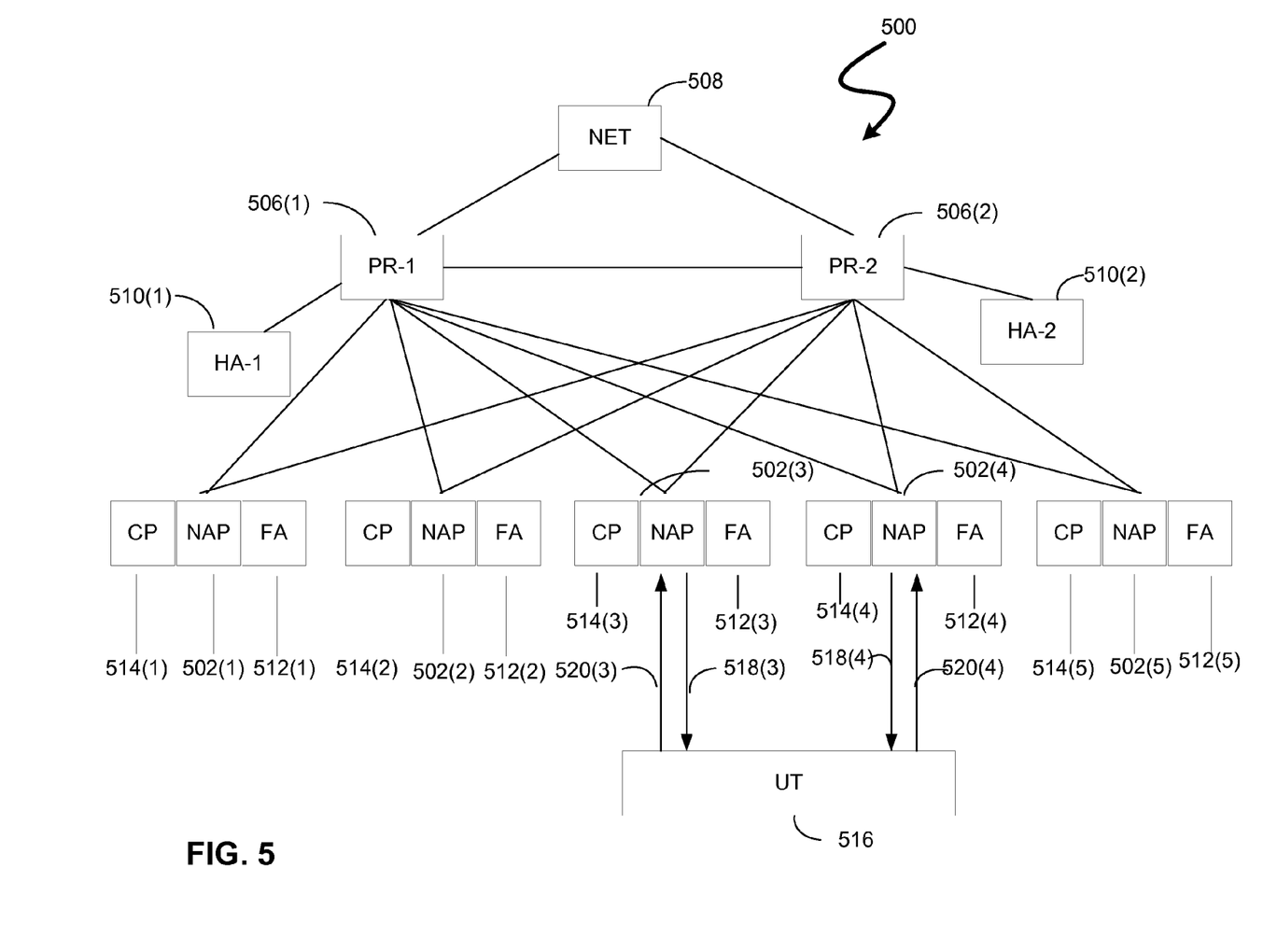
FIG. 5 shows a multiple-router wireless packet data network, according to another embodiment of the present invention.

FIG. 5 shows a multiple-router wireless packet data network 500, according to another embodiment of the present invention.

A wireless serving area of the wireless packet data network 500 is covered by a plurality of network access points 502, five of which 502(1), 502(2), 502(3), 502(4), and 502(5) are shown for illustration purposes. The network access points 502 are configured to transmit signals over a forward wireless link 518 to a plurality of user terminals 516, and receive signals over a reverse wireless link 520 from a plurality of user terminals 516. Each network access point 502 is connected to a plurality of packet routers 506. Each connection between any packet router 506 and any network access point 502 is configured to provide a bi-directional exchange of data packets. The packet routers 506 are connected to the rest of the network 508. Furthermore, the packet routers 506 may be connected to one another.

A packet destined to a user 516 through the network 508 is provided to one of the routers 506, e.g., router 506(1). The decision, which router 506 to use is made in accordance with routing protocols such as Open Shortest Path First (OSPF), Boarder Gateway Protocol (BGP), and other routing protocols known to one skilled in the art. The packet router 506(1) forwards the packet to a home agent 510(1) associated with the router 506(1). The home agent 510(1) is configured to maintain track of user terminal 516 current location in the form of a care-of address. The care-of address is an address of a foreign agent 512 co-located with the access point that serves the user terminal 516. The use of home agents and foreign agents is well known to those skilled in the art and is described in such mobility protocols as Internet Engineering Task Force RFC 2002. The home agent 510(1) then encapsulates the packet into a packet destined to the care-of address of the user terminal 516, (e.g., foreign agent 512(3)) and sends the encapsulated packets through the connection between the packet routers 506(1) and the network access point 502(3).

Upon receiving the encapsulated packet, the foreign agent 512(3) will de-encapsulate the encapsulated packet and forward the packet destined for transmission to user terminal 516 to a control point 514(3) associated with the network access point 502(3). The control point 514(3) manages the wireless links 518(3) and 520(3). Management includes power control, handoff, and other management functions known to persons with ordinary skills in the art. The control point 514(3) forwards the packet for transmission to the network access point(s) 502 that currently provide a wireless link to the user terminal 516.

As described, the user terminal 516 is served by the control point 514(3), which is co-located with the network access point 502(3), with which the user terminal 516 has established communication. However, as depicted in FIG. 5, the user terminal 516 is moving from the area served by the network access point 502(3) to the area served by a network access point 502(4). The control point 514(3) now manages the wireless links 518 and 520 for both network access points 502(3) and 502(4). In one embodiment, once the user terminal 516 leaves the area served by the network access point 502(3) for the area served by the network access point 502(4), the control point 514(4) continues to manage the second network access point 502(4). In another embodiment, the control point 514(3) transfers the management to the control point 514(4), once the user terminal 516 leaves the area served by the network access point 502(3) for the area served by a network access point 502(4). Furthermore, although a two access points 502 handoff was described, each control point 514 may be configured to manage a plurality of network access points 502 to concurrently communicate with the user terminal 516.

Although two particular embodiments were described, due to distributed nature of the network 500 and complete interconnectivity, the network operator may establish any convenient method for determining when to retain control in the current control point 514 and when to transfer control to another control point 514. Consequently, the actual network access point 502 communicating with the user terminal 516 may be different from the control point 514 associated with a network access point 502, or may be the same.

Soft handoff is not the only possible event that triggers a decision on whether to retain control in the current control point 514 or to transfer control to another control point 514. Load sharing, failure of a control point 514, and similar considerations may be used by the operator to determine when to trigger a decision.

Each control point 514 may be configured, if desired, to cache data link protocol information for the user terminal 516 during periods when the user terminal 516 is not assigned a traffic channel. If this is done, the caching control point 514 may be associated with the network access point 502 first used by the user terminal 516, with the network access point 516 last used by the user terminal, or any other network access point 502.

INDUSTRIAL APPLICABILITY

The present invention is capable of exploitation in industry, and can be made and used, whenever a distributed packet data network providing mobility is desired.

Several examples and modes for practicing the present description are described herein. However, the true spirit and scope of the invention are not limited thereto, but are limited only by the appended claims and their equivalents.

The invention claimed is:

1. An apparatus, comprising:
a network access point; and
a control point co-located with the network access point and configured to control communications between at least two network access points of a plurality of network access points and at least one remote user and to transfer control over the network access point to a different control point and
wherein said control point is configured
to control a communication between the network access point and the at least one remote user,
to select both the network access point that is co-located with the control point and a second network access point that is not co-located with the control point to communicate with a remote user when the remote user leaves an area served by the network access point and enters an area served by the second network access point, and
to subsequently select only the second network access point to communicate with the remote user.

2. The apparatus of claim 1, wherein the control point is configured to manage power control and handoff of the at least one remote user.

3. The apparatus of claim 1, wherein the network access point further communicates with at least two routers of a plurality of routers and to an associated foreign agent.

4. A method comprising:
receiving at a network access point data intended for at least one remote user; and
transmitting from the network access point the received data to the remote user under control of a control point co-located with the network access point, wherein the control point is configured to control communications between at least two network access points of a plurality of network access points and the at least one remote user and to transfer control over the network access point to a different control point and
wherein said control point is configured
to control a communication between the network access point and the at least one remote user,
to select both the network access point that is co-located with the control point and a second network access point that is not co-located with the control point to communicate with a remote user when the remote user leaves an area served by the network access point and enters an area served by the second network access point, and
to subsequently select only the second network access point to communicate with the remote user.

5. The method of claim 4, wherein the control point is configured to manage power control and handoff of the at least one remote user.

6. The method of claim 4, wherein the network access point further communicates with at least two routers of a plurality of routers and to an associated foreign agent.

7. The method of claim 4, wherein the transmitting further comprises:
transferring control from the control point to the different control point, the different control point being co-located with one of the at least two network access points.

8. An apparatus comprising:
means for receiving at a network access point data intended for at least one remote user; and
means for transmitting from the network access point the received data to the remote user under control of a control point co-located with the network access point, wherein the control point is configured to control communications between at least two network access points of a plurality of network access points and the at least one remote user and to transfer control over the network access point to a different control point and
wherein said control points configured
to control a communication between the network access point and the at least one remote user,
to select both the network access point that is co-locate with the control point and a second network access point that is not co-located with the control point to communicate with a remote user when the remote user leaves an area served by the network access point and enters an area served by the second network access point, and
to subsequently select only the second network access point to communicate with the remote user.

9. The apparatus of claim 8, wherein the control point is configured to manage power control and handoff of the at least one remote user.

10. The apparatus of claim 8, wherein the network access point further communicates with at least two routers of a plurality of routers and to an associated foreign agent.

11. The apparatus of claim 8, further comprising means for transferring control from the control point to the different control point, the different control point being co-located with one of the at least two network access points.

* * * * *